United States Patent

Maclagan et al.

[15] 3,684,830

[45] Aug. 15, 1972

[54] AMPLIFIER MOUNTED ON ROTOR OF GAIN CONTROL DEVICE

[72] Inventors: Robert Gordon Maclagan; Geoffrey William Griffiths, both of Cambridge, England

[73] Assignee: Pye Limited

[22] Filed: Feb. 11, 1970

[21] Appl. No.: 10,495

[30] Foreign Application Priority Data

Feb. 12, 1969 Great Britain............7,633/69
Feb. 12, 1969 Great Britain............7,634/69

[52] U.S. Cl...............179/1 A, 200/11 D, 179/107 R, 179/1 VL

[51] Int. Cl...............................................H03g 3/00

[58] Field of Search.179/1 A, 107 R, 107 E, 107 BC, 179/1 VL, 1 SW; 317/234 M, 101 A, 101 B, 101 C, 101 DH; 200/24, 11 DA; 330/1 R; 338/127

[56] References Cited

UNITED STATES PATENTS

| | | | |
|---|---|---|---|
| 2,971,065 | 2/1961 | Busse | 179/107 E |
| 3,270,146 | 8/1966 | Eberhard | 179/107 E |
| 3,209,083 | 9/1965 | Posen | 179/107 |
| 3,061,677 | 10/1962 | Johnson | 179/107 |
| 2,393,184 | 1/1946 | Passow | 179/107 |

FOREIGN PATENTS OR APPLICATIONS

| | | | |
|---|---|---|---|
| 1,146,545 | 4/1963 | Germany | 179/107 |

*Primary Examiner*—Kathleen H. Claffy
*Assistant Examiner*—Jon Bradford Leaheey
*Attorney*—Frank R. Trifari

[57] ABSTRACT

The present invention relates to amplifying arrangements of sub-miniature construction which are provided with means for varying the gain of the amplifier. In particular, though not exclusively, the invention relates to hearing aids of the "behind the ear" type. The amplifier circuit is supported by a disc of insulating material. Around the periphery of the disc there is a plurality of discrete areas of conductive material adapted for both external connection from the disc and connection to the amplifier circuit. At least some of these conductive areas are connected to the amplifier circuit by resistors thereby forming a gain control device for the amplifier. The disc is rotatably mounted and adapted to serve as the rotor of the gain control device.

10 Claims, 12 Drawing Figures

INVENTORS
ROBERT G. MACLAGAN
GEOFFREY W. GRIFFITHS
BY
Frank [signature]
AGENT

INVENTORS
ROBERT G. MACLAGAN
GEOFFREY W. GRIFFITHS
BY
AGENT

INVENTORS
ROBERT G. MACLAGAN
GEOFFREY W. GRIFFITHS
BY
*Frank R. Trifari*
AGENT

INVENTORS
ROBERT G. MACLAGAN
GEOFFREY W. GRIFFITHS
BY
AGENT

INVENTORS
ROBERT G. MAC LAGAN
BY GEOFFREY W. GRIFFITHS

AGENT

INVENTORS

ROBERT G. MACLAGAN
BY GEOFFREY W. GRIFFITHS

AGENT

AMPLIFIER MOUNTED ON ROTOR OF GAIN CONTROL DEVICE

In hearing aids of this type it is necessary to provide a microphone, an amplifier with variable gain (volume) and on-off controls, and a battery. All of these elements must fit within an enclosure sufficiently small to fit comfortably behind the ear of the user. It has been the practice with such hearing aids to employ as a volume control either a miniature rotary variable resistor or potentiometer provided with an edge-wheel type of control knob or a miniature slide-type variable resistor or potentiometer. An on-off switch may be incorporated with the volume control, or a separate switch may be used. Components of this type require a substantial amount of space relative to the overall dimensions of the hearing aid, especially when the amplifier is formed by thick-film or integrated circuit techniques, and also requires inter-wiring with the amplifier circuit.

In one aspect the present invention provides an amplifying arrangement in which an amplifier circuit is supported by a disc of insulating material, the disc being provided at or adjacent its periphery with a plurality of discrete areas of conductive material connected to the amplifier circuit and adapted for external connection from the disc. At least some of the discrete areas have their connections to the amplifier circuit by way of individual resistors to form a gain control device for the amplifier circuit.

From a further aspect the present invention also provides an amplifying arrangement in which an amplifier circuit is supported by a disc of insulating material, said disc being provided at or adjacent its periphery with a plurality of discrete areas of conductive material connected to said amplifier circuit and adapted for external connection from said disc. At least some of said discrete areas have their connections to said amplifier circuit by way of a plurality of resistors, said disc being adapted to serve as the rotor of a gain control device for said amplifier circuit, said gain control device incorporating said resistors. The disc may be additionally adapted to serve as the rotor of a switch, the contact of which is formed by one of said discrete areas.

The discrete areas of conductive material may be formed on the obverse side of the disc supporting the amplifier or around the peripheral edge of the disc.

The amplifier arrangement is adapted to be carried in a recess formed in a body of insulating material, a segment of the disc protruding beyond the recess. Electrical contacts are preferably provided on the insulating body to selectively engage with the discrete areas of conductive material. These contacts serve to convey a power supply to the amplifier circuit and also serve as a means for applying an input signal and deriving an output signal from the amplifier circuit. Additionally at least one contact serves to engage with the discrete areas connected to the resistors. The arrangement may be such that in a first position the contacts do not engage with any of the discrete areas, but when the disc is rotated in its recess, engagement will take place between the contacts and the discrete areas thus energizing the amplifier circuit while providing a step-by-step control of the gain.

The discrete areas of conductive material are preferably formed by conventional thick-film technology, the insulating disc acting as a substrate. The amplifying circuit may additionally be formed by the same technology or may be a monalithic integrated circuit.

The present invention also provides a hearing aid comprising a body of insulating material provided with a recess in which is located an amplifying circuit arrangement according to the present invention.

The present invention additionally provides a variable resistive device comprising a body of insulating material provided with a recess in which is located a disc of insulating material, a portion of the circumference of the disc protruding beyond the recess, said disc serving as the substrate for a thick-film circuit forming a plurality of resistive elements connected to discrete areas of conductive material. Contact members are also provided to selectively engage with the areas of conductive material.

The areas of conductive material may be provided in a uniform pattern close to the peripheral edge of the disc or may be provided at the periphery of the disc and may further extend onto the side wall of the disc. One of the areas of conductive material may extend to the center of the obverse side of the disc and may there be connected to a further area of conductive material which is engaged by one of the contact members.

The contact members may be spring contact fingers which additionally serve to retain the disc in the recess. The path between two such contact members has a resistance depending on the resistive pattern of the thick-film circuit and the particular portions of the circuit seen by the contact members. The resistance of the variable resistive device is varied by rotating the disc.

In order to limit the rotation of the disc it may be provided with a projection which extends from the periphery of that portion of the disc which protrudes beyond the recess, this projection engaging with one or the other shoulders on the insulating body. Alternatively, the disc may be made thicker than the depth of the recess, the disc being provided with a projection which extends from its periphery which overhangs the edge of the recess, this projection engaging with a stop provided on the body.

When the areas of conductive material extend onto the side wall of the disc, a spring contact member may selectively engage with the extended areas of the conductive material on the side wall and urge the disc against the side wall of the recess, a lip being provided over that portion of the recess against which the disc is urged to retain the disc in the recess. A further area of conductive material may then be provided centrally on the reverse side of the disc, and at least the resistive elements on the obverse side of the disc being covered by a protective coating.

An advantage of a variable resistive device according to the present invention is that it may be small in size, its size being determined principally by the requirements of the thick-film circuit. The spindle and brush assembly of conventional variable resistors is eliminated as the contact members do not directly engage the resistive track. Noise which is normally created due to engagement with the resistive track is eliminated.

The above and other features of the present invention will be more readily understood by a perusal of the following description taken with reference to the accompanying drawings in which.

Figure 1:
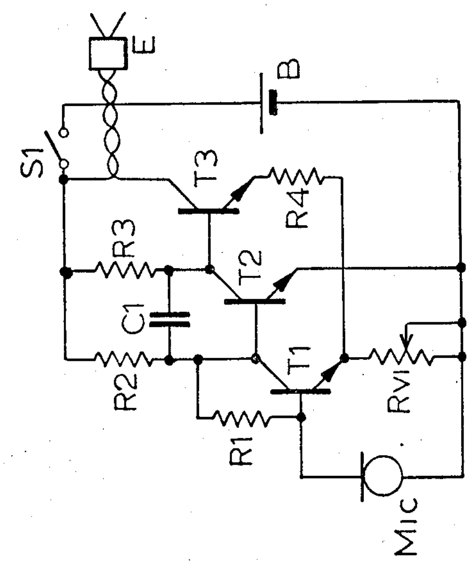
FIG. 1 is a circuit diagram of a hearing aid of known type.

Referring first to FIG. 1, this shows a typical circuit arrangement for a hearing aid. In the circuit a microphone Mic is coupled to an amplifier comprising transistors T1, T2 and T3 and their associated resistive and capacitive components R1, R2, R3, R4, RV1 and C1. Variable resistor RV1 serves as the volume control and switch S1 as the on-off switch. The output signal from the amplifier is fed to an earpiece E and power is supplied by a battery B.

Figure 2:
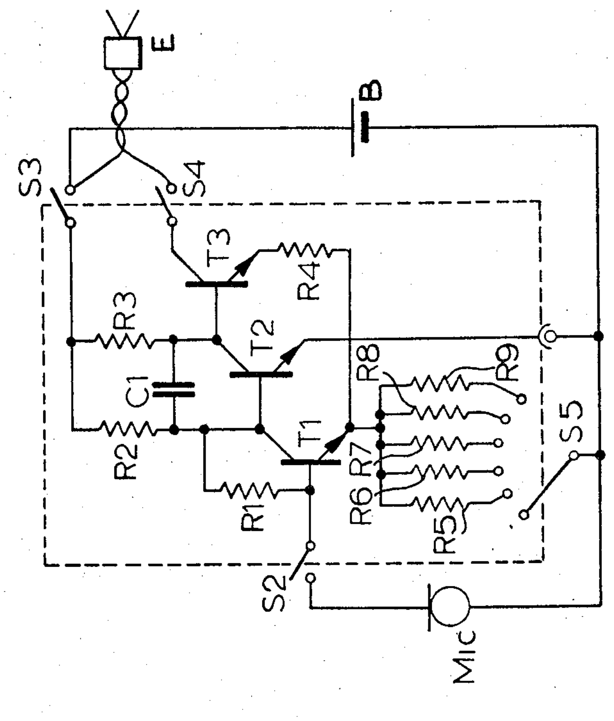
FIG. 2 is a circuit diagram of a hearing aid for use with the present invention.

In FIG. 2 is illustrated a circuit similar to that of FIG. 1 but modified for use with the present invention.

Figure 3:
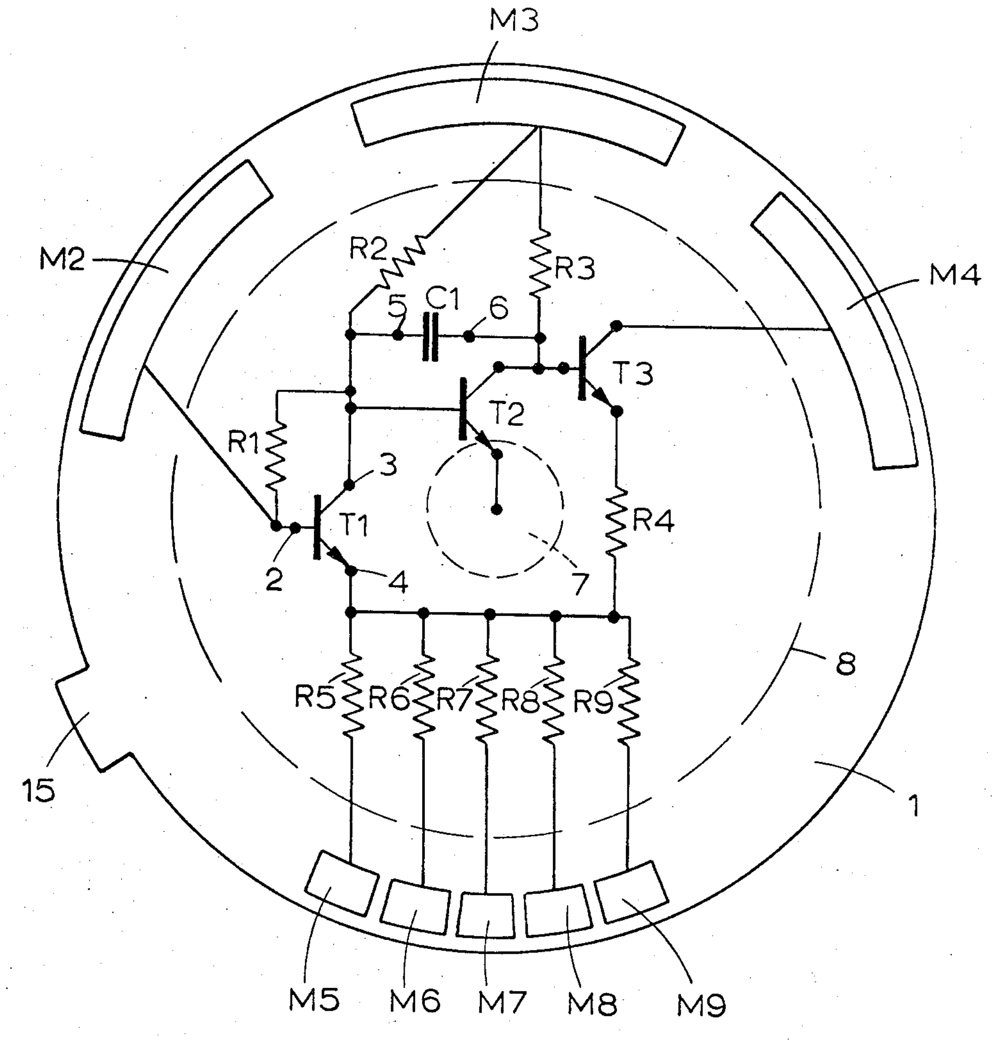
FIG. 3 is a diagrammatic view of an amplifying arrangement according to the present invention.

In FIG. 2, the variable resistor RV1 has been replaced by the resistors R5 to R9 which are commoned at one of their ends, their other ends being connected to the contacts of a switch S5 to form a step-by-step volume control. Also in FIG. 2 switches S2 and S4 are additionally provided respectively at the input and the output of the amplifier, the switch S1 of FIG. 1 being designated S2 in FIG. 2. The components shown within the dotted rectangle are formed as a thick-film circuit carried upon a substrate of disc form. The disc also serves as the rotor of a multi-pole rotary switch, so that switches S2 to S5 are provided by suitably shaped and positioned conductive portions of the thick-film circuit which co-operate with stationary contact fingers secured to the housing of the disc. FIG. 3 illustrates the manner in which the circuit of FIG. 2 is arranged on the disc substrate 1.

With the disc of FIG. 3 the conductors are first laid down on the substrate, e.g. by silk screen printing employing conductive ink. The pattern of conductors includes the areas having the references M2 to M9, of which areas M2, M3 and M4 are intended to serve as the contacts of switches S2 to S4, respectively, whereas areas M5 to M9 are intended to serve as the contacts of switch S5. These areas are shown in detail in FIG. 3, the remainder of the conductive pattern on the obverse side of the substrate being shown schematically by lines indicating the paths but not the widths of the conductors.

A conductive area 7 is also formed on the reverse side of the substrate and serves as a contact for the negative side of the power supply, which is not switched. It is connected to the conductive pattern on the obverse side of the substrate via a small hole at the center of the disc.

After the conductive pattern has been completed, resistors are added, e.g. by silk screen printing employing resistive ink, these also being shown diagrammatically in FIG. 3. When the patterning is completed, the discrete components, i.e. transistors T1 to T3 and capacitor C1, are then added.

The transistors comprise unencapsulated dice of semiconductor material, each die having the necessary p.n. junctions formed within it and having a collector contact area formed on one face, while base and emitter contact areas are formed on an opposed face.

In the case of transistor T1, the die is placed on the substrate with its collector contact resting upon a conductive pad 3 and is bonded thereto, e.g. by soft solder. Fine wires are then bonded to the base and emitter contacts of the die, the other ends of the wires being bonded respectively to the connection pads 2 and 4, which were printed on the substrate as part of the conductive pattern. Transistors T2 and T3 are mounted on the substrate in a similar manner. It will be noted that the emitter of T2 is connected to contact area 7 on the reverse side of the substrate.

The capacitor C1, which is preferably of the miniature disc type, is attached to the substrate by bonding its lead-out wires to the connection pads 5 and 6.

When the circuit has been completed it is encapsulated by applying to the obverse side of the substrate a layer of epoxy resin, so as to cover the resistive elements, transistors and capacitor, but not the contact areas M2 to M9. The approximate limit of the encapsulation is indicated in FIG. 3 by the broken line 8.

Figure 5:
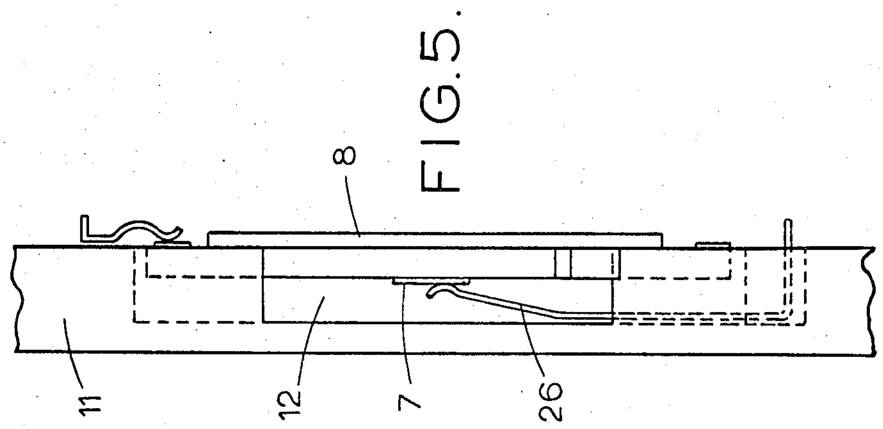
FIGS. 4 and 5 show a housing for the amplifying arrangement of FIG. 3.
Figure 4:
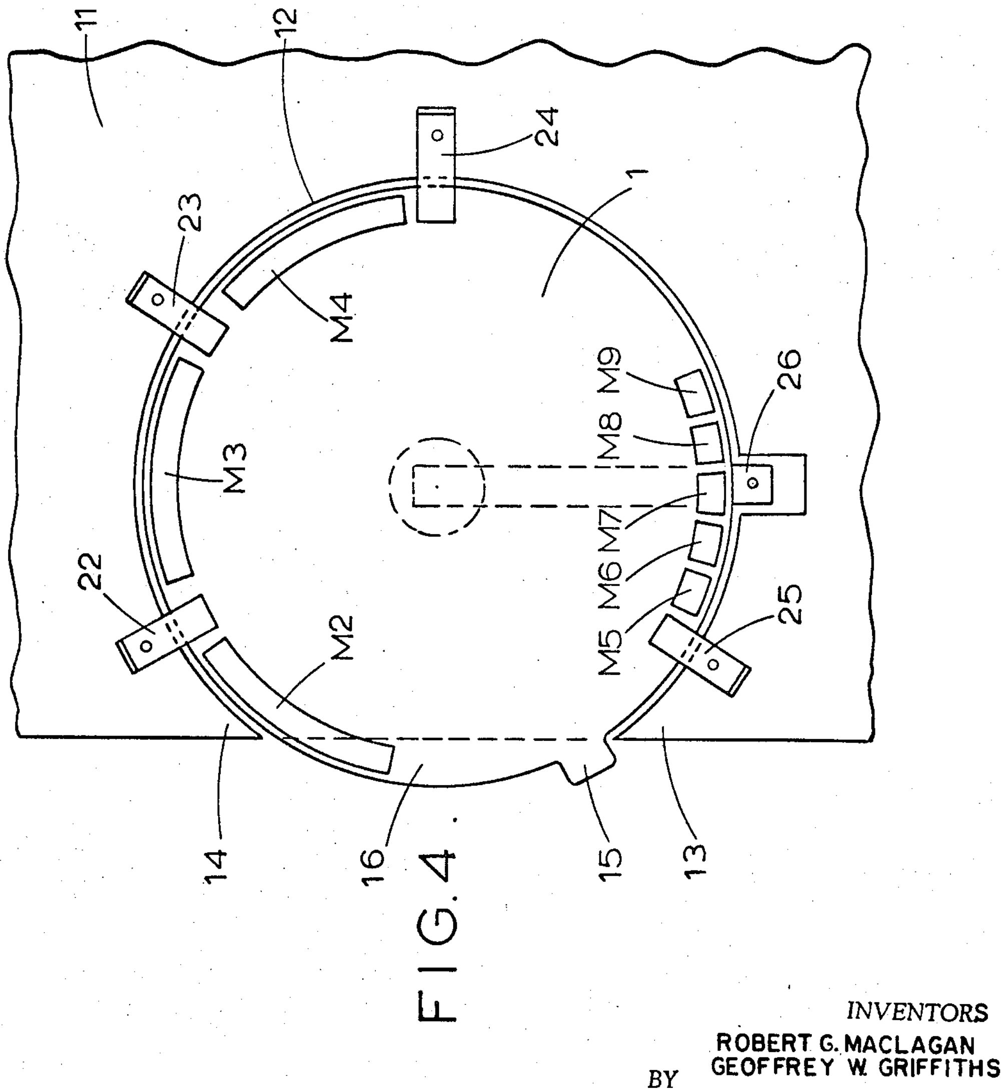

Referring now to FIGS. 4 and 5, a body of insulating material 11 has formed in it a recess 12 shaped to accept the disc 1 so that a portion 16 of the periphery on the disc projects beyond the body 11. The disc 1 is free to rotate in recess 12, but its rotation is limited by a projection 15 formed on the disc 1 which comes in contact with one or the other of the shoulders 13 and 14. A spring finger contact 26 is secured to the body 11 and lies within the recess, contacting and exerting an upward pressure on the contact area 7 on the reverse side of the disc. Further spring finger contacts 22, 23, 24 and 25 are secured to the body 11 at positions spaced round the periphery of recess 2 and bear on the obverse side of disc 1.

The position of the projection 15 relative to the conductive areas M2–M9 and the positions of finger contacts 22–25 are chosen so that with disc 1 in its fully anticlockwise position, i.e. projection 15 contacting shoulder 13, fingers 22–25 all bear on insulating portions of the disc. On initial clockwise rotation of disc 1, the conductive area M2 comes into contact with finger contact 22, M3 with 23, M4 with 24 and M5 with 25. On further clockwise rotation, areas M6, M7, M8 and M9 come successively into contact with finger contact 25, M9 being in contact when projection 15 reaches shoulder 14. During this further rotation, M2, M3 and M4 remain in contact with respective finger contacts 22, 23 and 24. Throughout the entire rotation finger contact 26 remains in contact with area 7.

The remaining elements of the hearing aid, i.e. microphone, earpiece and battery are housed in a casing of which the body 11 forms a part. To complete the circuit, finger contacts 25 and 26 are connected together, to a first terminal of the microphone Mic. and to the negative pole of the battery. The second terminal of the microphone is connected to finger contact 22. The positive pole of the battery and one terminal of the earpiece are connected to finger contact 23, while the second terminal of the earpiece is connected to finger contact 24.

With the disc in the fully anticlockwise position, amplifier and earpiece are disconnected from the battery. On initial clockwise rotation, the battery, microphone and earpiece circuits are closed, and the amplifier gain is determined by resistor R5. On further rotation resistor R5 is replaced successively by resistors R6–R9, giving five steps of gain determined by the respective values of R5–R9.

A feature of the arrangement of FIGS. 4 and 5 is that contacts 23 and 25 are arranged to lie on a diameter of disc 1 while contacts 22 and 24 are symmetrically disposed on either side of that diameter, contact 26 applying pressure centrally to disc 1. Thus the disc 'floats' between contact 26 and contacts 22–25. The contact pressure is uniformly distributed between the contacts and is unaffected by the rotation of the disc.

Contact 25 is preferably secured to body 11 in such a manner that it can be moved clear of disc 1 to permit removal and replacement of the disc.

The invention is not restricted to the particular hearing aid arrangements described. More or fewer steps of gain control may be provided and different amplifier circuits may be employed. The amplifier itself need not be formed by thick-film technology, but may be an integrated circuit formed on a monolithic substrate. The contact areas may be arranged on the edge of the disc in a similar manner to that described below with reference to the variable resistive device shown in FIGS. 6 to 12.

Figure 7:
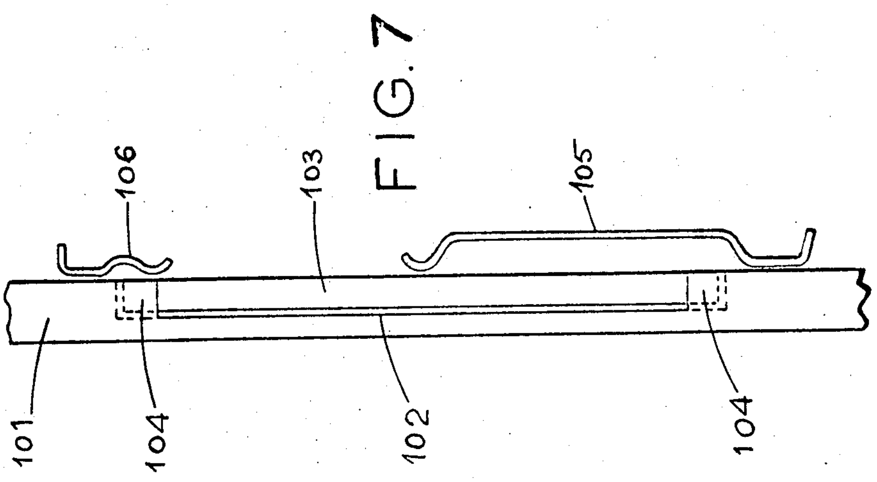
FIGS. 6 and 7 are respectively plan and side views of a variable resistor according to the invention.
Figure 6:
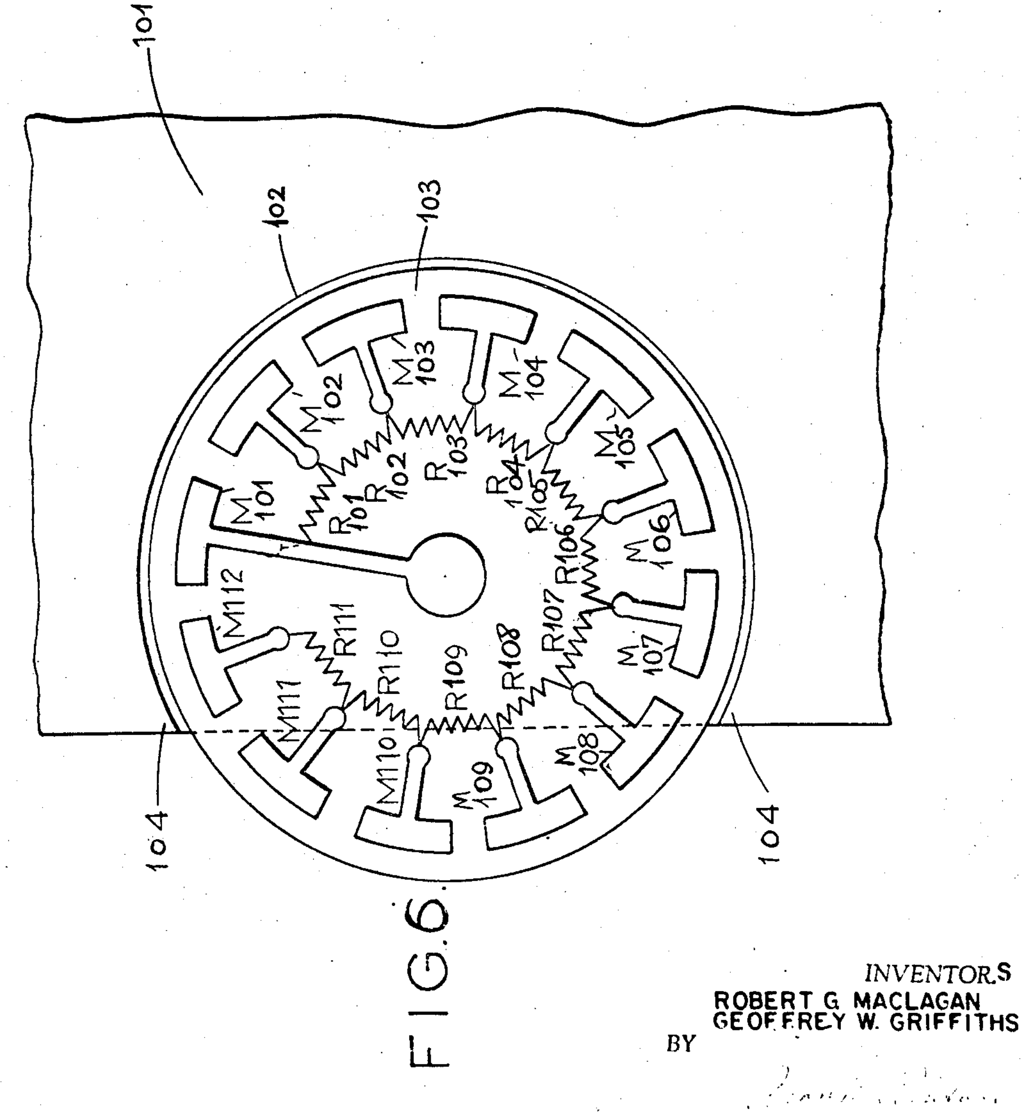

Referring now to FIGS. 6 and 7, reference 101 denotes a body of insulating material which may, for example, form part of the outer casing of an amplifier. The body 101 is preferably moulded in plastics material. A recess 102, having the shape of a segment of a circle, is formed in the body 101. The width of recess 102 in less than the thickness of body 101, and substantially equal to the thickness of an insulating disc 103 which lies in the recess. A portion or segment of the disc 103 protrudes beyond the edge of body 101, but the disc is restrained laterally by shoulders 104 of the body 101.

Spring electrical finger contacts 105 and 106 are secured to the body 101 and bear on the surface of the disc 103. For the sake of clarity, fingers 105 and 106 are omitted in FIG. 6. The disc 103 is thus constrained to remain within the recess 102, but may be rotated within the recess by a tangential force applied to the periphery of its protruding portion.

The disc 103 is formed of a material such as alumina adapted to serve as a substrate for a thick-film circuit. On the upper surface of the disc, i.e. the surface contacted by the spring fingers 105 and 106, is formed a pattern of conductive and resistive elements.

The conductive elements M101–M112 are isolated one from another and are disposed symmetrically close to the periphery of the disc in a position to be contacted successively by the spring finger 106 as the disc is rotated. Element M101 has an extension to the center of the disc so that is is contacted at all times by the finger 105.

The pattern of conductive elements may be produced by any one of a plurality of methods commonly employed in the production of thick-film circuits. For example, conductive ink may be printed onto the substrate through a silk screen and the disc subsequently fired. Alternatively, a metallic pattern may be produced by vapor deposition in a vacuum through a suitable mask. In a third method, the entire surface of the disc is coated with metal, a photoresist mask is formed, and the unwanted metal etched away.

The pattern of resistive elements is subsequently formed on the substrate, again by employing any of the known methods, e.g. silk screen printing employing resistive ink or vacuum deposition of the vapor of a resistive alloy. In FIG. 6, resistive elements R101–R111 are shown connected respectively between successive pairs of the conductive elements M101–M112. The combined pattern of conductive and resistive elements forms a tapped resistor chain and by rotation of the disc 102 any one of the tapping points can be brought into alignment with the contact 106.

The resistive elements R101 to R112 may all have equal resistive values. Alternatively, by suitable proportioning of the silk screen or mask used in producing the resistive pattern, the elements may be given different values so as to produce a graded chain of resistors.

The pattern of conductive and resistive elements is not restricted to the arrangement shown in FIG. 6. More or fewer contact areas may be employed while the resistive elements may be arranged radially, each extending between a common contact area at the center and one of a plurality of contact areas near the periphery of the disc. In this way resistors which may each be of different value will be brought successively into circuit as the disc is rotated.

Figure 8:
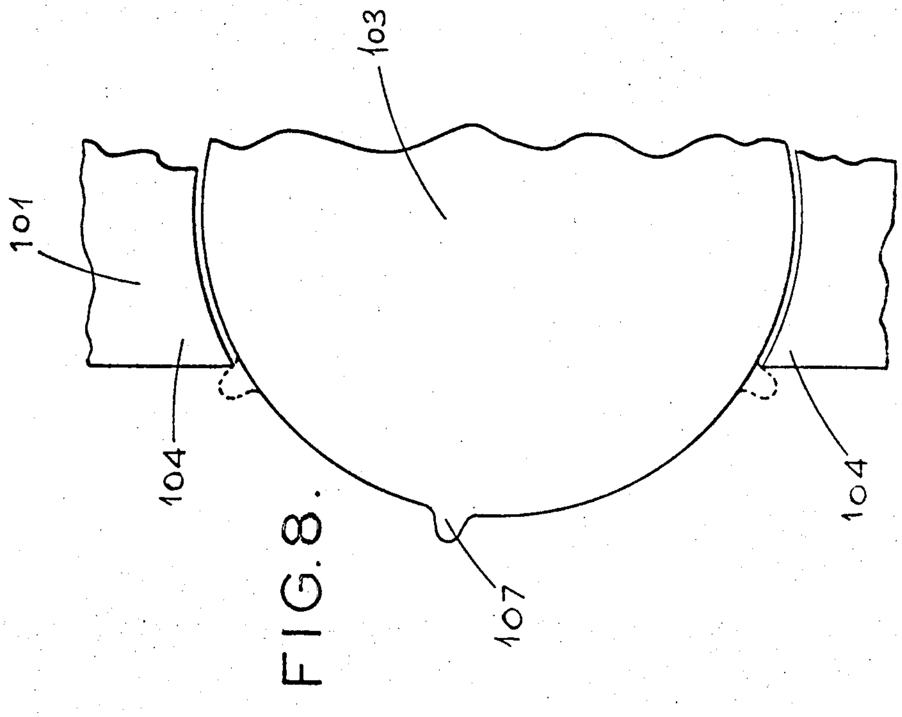

In the arrangement of FIG. 6, the disc is capable of continuous rotation. If limited rotation is required, stops may be provided in a variety of ways. In the arrangement of FIG. 8, a projection 107 on that part of the periphery of disc 103 which protrudes beyond body 101 comes into contact with one or other of the shoulders 104 to limit the rotation of the disc. With this arrangement the maximum angle of rotation is limited to approximately 120°. Lesser angles can be provided by increasing the peripheral length of projection 107.

Figure 10:
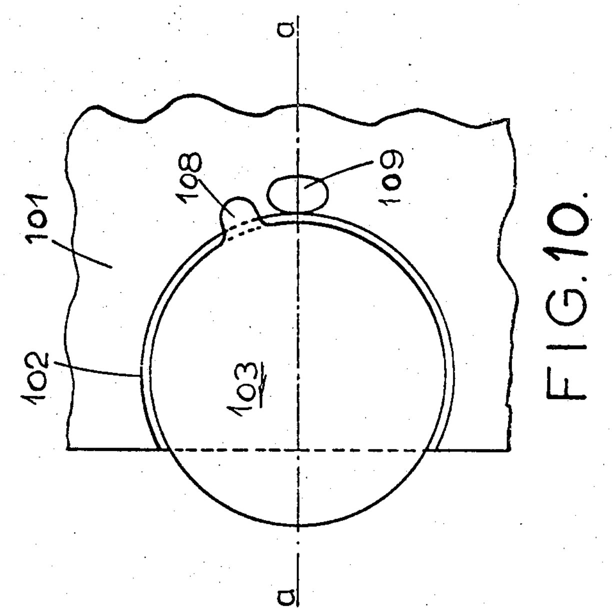
FIGS. 8, 9 and 10 are detail drawings illustrating further features of the variable resistor.
Figure 9:
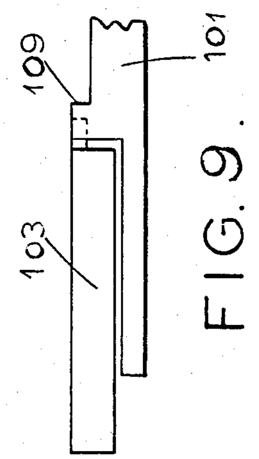

To permit angles of rotation comparable to the 300° commonly available in variable resistors of conventional construction, the arrangement of FIGS. 9 and 10 may be employed. The disc 103 is now made somewhat thicker than the depth of the recess 102. A projection 108 overhangs the edge of recess 102 and cooperates with a raised stop 109 on body 101.

Those parts of the conductive pattern which may tend to be abraded by the contact fingers may be built up in thickness and/or provided with wear resistant surfaces, e.g. by plating.

In an alternative arrangement the peripheral portions of the conductive elements may be extended over the edge of the disc and contact made by a spring finger pressing against the edge. A central contact area may be provided on the reverse side of the disc, connected to a conductive area on the obverse, e.g. by through plating a central hole in the disc. This facilitates encapsulating the resistive elements by applying a layer of encapsulating material such as an epoxy resin to the obverse of the disc. The encapsulating layer is confined to the central area containing the resistive elements and does not encroach upon the peripheral region containing the contact areas.

Figures 11, 12:
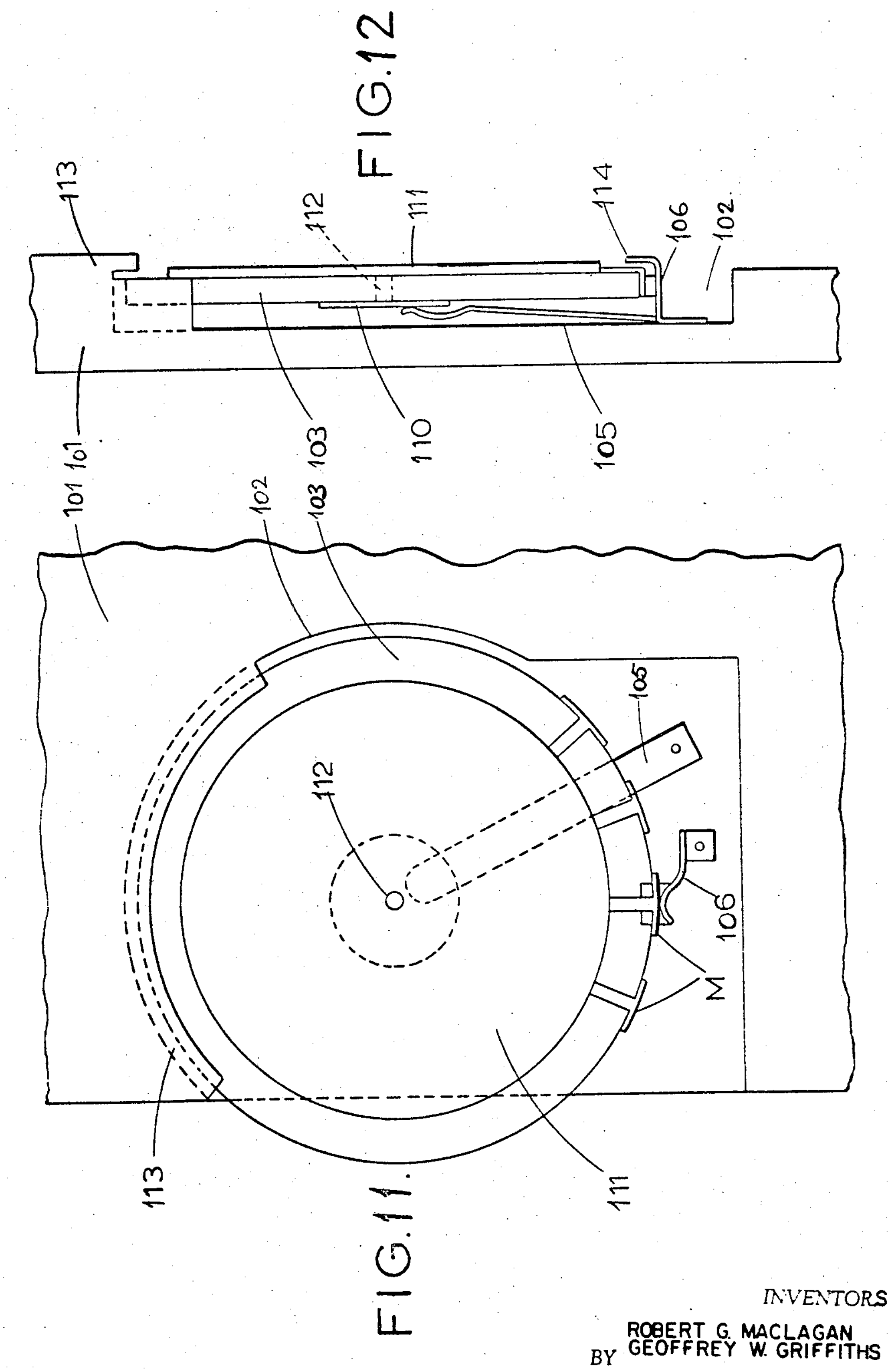
FIGS. 11 and 12 are respectively plan and side views illustrating a second embodiment of the variable resistor.

An embodiment incorporating these features is illustrated in FIGS. 11 and 12 in which a body of insulating material 101 is provided with a recess 102 to accept a disc 103. As compared with the arrangement of FIG. 6, the shape of the recess 102 is modified to accommodate the spring finger contacts 105 and 106.

The disc 103 is provided with metallic contact areas M spaced round the periphery of the disc and connected to a thick-film circuit formed on the obverse side of the disc and covered by a layer of glaze or resin 111. A metallic contact area 110, placed centrally on the reverse side of the disc is also connected to the thick-film circuit via a hole 112. The spring finger 105 makes contact with the area 110.

The pressure of spring finger 106 forces the disc 102 against the curved periphery of the recess 102 and restrains the disc in the lateral direction. To provide restraint in a direction normal to the plane of the disc, a lip 113 is provided over a part of the periphery of the recess opposite to spring finger 106, the finger 106 being additionally provided with a flange 114 (shown in FIG. 12 only). The lip 113 and the flange 114 engage with the upper surface of the disc 103, holding it against the pressure of spring 105. Thus the disc is retained within the recess but is free to rotate.

In the above described embodiments of FIGS. 6 to 12, reference has been made to the use of connections to a common conductive element and one of a plurality of additional conductive elements. By suitable proportioning of the resistive elements, the variable resistive effect may be alternatively obtained by a pair of spring finger contacts engaging adjacent conductive elements.

Although in the above description a variable resistor has been described, it is possible to convert the variable resistor into a potentiometer by the provision of a contact arrangement capable of making continuous electrical contact with the final resistor in the chain. Thus in the arrangement of FIG. 6 a contact region with its associated spring contact may be provided centrally on the reverse side of the disc 103. This region may be connected through the disc to the junction of resistor R111 and the contact M112. The additional contact need not be circular but may alternatively form an annulus coaxial with the disc 103.

What is claimed is:

1. An amplifying arrangement comprising an amplifier circuit supported by a disc of insulating material rotatably mounted within a recess formed in a body of insulating material, a peripheral segment of said disc protruding beyond said recess, said disc being provided at or adjacent its periphery with a plurality of discrete areas of conductive material connected to said amplifier circuit and adapted for external connection from said disc, means individually connecting at least some of said discrete conductive areas to said amplifier circuit by way of a plurality of resistors so as to form a gain control device for the amplifier circuit that includes said resistors, said disc being adapted to serve as the rotor of said gain control device.

2. An amplifying arrangement as claimed in claim 1 in which electrical contacts are provided on said body to selectively engage with the said areas of conductive material.

3. An amplifying arrangement as claimed in claim 2 in which said disc is provided with a projection member which extends radially from said segment, said projection member engaging with one or the other shoulders formed on said body so as to limit the extent of rotation of said disc within said recess.

4. An arrangement as claimed in claim 3 in which when said disc is in a first position with said projection engaging one of said shoulders said electrical contacts are insulated from said areas of conductive material while when said disc rotatably moved to positions other than said first positions, said contacts electrically engage with their associated areas of conductive material.

5. An arrangement as claimed in claim 2 in which said disc is provided with a further discrete area of conductive material on the side opposite to that on which said amplifier circuit is supported, said further area being in continuous engagement with a further electrical contact provided on said insulating body.

6. An arrangement as claimed in claim 2 in which said first mentioned electrical contacts extend over said recess to selectively engage with said first mentioned discrete areas provided on the obverse side of said disc and adjacent the edge thereof, said first mentioned electrical contacts being arranged to exert a force on the disc so as to retain said disc within said recess.

7. An arrangement as claimed in claim 6 in which one of said contacts is adapted to be moved clear of the recess so as to allow said disc to be removed from said recess.

8. An arrangement as claimed in claim 6 wherein said disc includes a further discrete area of conductive material centrally located on the reverse side of the disc, a further electrical contact mounted on said insulating body and in continuous engagement with said further conductive area so as to exert a counter force on the disc opposite to that of said first mentioned contacts whereby the disc floats between said further contact and said first mentioned contacts.

9. A hearing aid incorporating an amplifier arrangement as claimed in claim 2 further comprising, means connecting the input of said amplifier circuit to a microphone through one of said electrical contacts, the output of said amplifier circuit to an earpiece through a second of said electrical contacts, and said amplifier circuit to a DC supply source through a further one of said electrical contacts.

10. A hearing aid as claimed in claim 9 in which said microphone, said earpiece and said supply source are housed in a casing external to said disc and in which said insulating body forms a part.

* * * * *

PO-1050
(5/69)

UNITED STATES PATENT OFFICE
CERTIFICATE OF CORRECTION

Patent No. 3,684,830 Dated August 15, 1972

Inventor(s) ROBERT GORDON MACLAGAN ET AL

It is certified that error appears in the above-identified patent and that said Letters Patent are hereby corrected as shown below:

col. 6, line 58, before "of" insert -- side --;

IN THE CLAIMS col. 8, line 11, cancel the line in its entirety;

line 12, cancel "engaging one of said shoulders";

line 14, cancel the line in its entirety;

line 15, cancel "than said first positions," and insert -- when said disc is in a first position with said projection engaging one of said shoulders and --;

line 16, before the period (.) insert -- when said disc is rotatably moved to positions other than said first position --;

Signed and sealed this 24th day of April 1973.

(SEAL)
Attest:

EDWARD M.FLETCHER,JR.
Attesting Officer

ROBERT GOTTSCHALK
Commissioner of Patents